Patented Jan. 9, 1940

2,186,851

UNITED STATES PATENT OFFICE 2,186,851

COLOR PHOTOGRAPHY

Gustav Wilmanns, Wolfen, Kreis Bitterfeld, and Wilhelm Schneider and Alfred Fröhlich, Dessau, Germany, assignors, by mesne assignments, to Agfa Ansco Corporation, Binghamton, N. Y., a corporation of Delaware No Drawing. Application October 1, 1937, Serial No. 166,832. In Germany October 7, 1936

10 Claims. (Cl. 95—6)

Our present invention relates to color photography and more particularly to improved dyestuff components for the process of color development.

It has for an object to provide color components which are soluble in water and which are fast to diffusion with respect to the silver halide emulsion.

A further object of the invention is to provide a new and improved process for preparing dyestuff forming components having these properties.

A further object is to provide silver halide emulsions containing the dyestuff forming components fast to diffusion.

A further object is to provide an improved film for color photography having superposed silver halide emulsion layers, each layer containing a dyestuff component fast to diffusion.

In U. S. Patents 2,179,238, 2,179,244 and 2,178,612 and U. S. patent applications filed July 15, 1936; Serial No. 94,340, filed August 5, 1936; and Serial No. 159,518, filed August 17, 1937, dyestuff components which are fast to diffusion have been disclosed.

The present invention is based on the observation that color formers which contain as a substituent a radical having substantially the chemical structure of a sterol such as sterol radicals or the radicals of products formed from sterols by chemical or biological reaction, have good fastness to diffusion. Such compounds are, for example, cholesterol or another sterol, cholesterol dicarboxylic acids, cholesteryl chloride, cholesteryl amine and the corresponding compounds of other sterols. Also bile acids, for example, cholic acid, cholanic acid, ethiobilianic acid, lithocholic acid, desoxycholic acid. The foregoing compounds partly occur naturally and may partly be obtained by oxidative splitting or by other chemical actions on the sterols.

The union of these sterol conversion products with the dyestuff components is produced with the aid of reactive atoms or atom groups which combine with the sterol or the sterol conversion product. Such groups are, for example, amino-groups, carboxyl-groups, hydroxy-groups and halogen atoms.

Dyestuff components into which these groups are introduced are, for example, α- and β-hydroxynaphthoic acids, 2.3 - hydroxyanthracene carboxylic acid, salicylic acid, hydroxyfluorene carboxylic acid, α-naphthol-aldehyde, hydroxyphenylmethylpyrazolone, also dyestuff formers having amino groups, for example, aminophenylmethylpyrazolone, amino-naphthols, amino-naphthol carboxylic acid and -sulfonic acid aminophenols, amino-benzoylacetic-acid ester arylides, amino-naphthoylacetic-acid ester arylides, acyl-acetic acid ester-aminoarylides.

The sterol radicals or the radicals of the conversion products may be introduced into the molecule of the color former in various manners, for example, a dyestuff component may be obtained by the action of cholanic acid chloride on 1-amino-5-hydroxynaphthalene-6-carboxylic acid in pyridine. If this body is added to a silver halide emulsion which is then poured to form a layer, a blue-green picture is obtained by color forming development. By the anti-diazotate process there is obtained a blue-red picture.

From cholesterylamine and α-hydroxynaphthoic acid chloride there may be obtained also by condensation in pyridine a dyestuff component containing a sterol radical. With such components there may be obtained pictures of colors similar to those described in the preceding example.

From cholesteryl chloride or cholesterol directly there may be made the ether of cholesterol on the one hand and amino-phenol on the other hand, and by reaction of the amino-group with an acylacetic acid ester there is obtained a dyestuff component which yields a yellow picture, either by color forming development or by treatment by a diazo-process. In this example another sterol containing a hydroxyl-group may be substituted for the cholesterol.

These dyestuff components containing sterol are fast to diffusion, that is to say they cannot be removed from the emulsion layer by mechanical means, for instance by washing. The layers are therefore particularly useful for the purpose of multi-color photography. In addition to their fastness to difflusion they have the effect of favorably influencing the surface tension of the emulsion which facilitates the pouring.

The dyestuff components of this invention may be added to the emulsion at any stage of its production. The silver halide emulsions thus produced may be made into layers in any known manner and may be applied on one or both sides of the carrier in superposition and sensitized to different regions of the spectrum. Other procedures are available, for instance, differently sensitized emulsions containing different color formers may be brought in the form of small particles onto the carrier. The emulsion layers may be combined with other layers in which the color formers have been produced by another process, for example by mordant dyeing or transformation.

The color pictures may be produced in various ways, for example that described in U. S. Patents 2,179,228, 2,179,238, 2,178,612 and U. S. patent applications Ser. No. 94,340, filed August 5, 1936, and Ser. No. 141,093, filed May 6, 1937. Or the components located in multi-layer film may be converted into azo-dyes following development and fixing by treatment with a diazo compound such as a carbonic acid solution of tetrazotized benzidine disulfonic acid. There is thus produced in each emulsion layer together with a silver picture a dyestuff in which no structure can be perceived by magnification. The film is then treated with a silver bleaching out bath, i. e. that described in British Patent 401,340 to produce the dye image.

What we claim is:

1. A photographic emulsion comprising a binding agent, a light-sensitive metal salt, and a color former or dyestuff component fast to diffusion with respect to said binding agent, said dyestuff component having chemically linked to its molecule a radical having substantially the chemical structure of a sterol.

2. A photographic emulsion comprising a binding agent, a light-sensitive metal salt, and a color former or dyestuff component fast to diffusion with respect to said binding agent, said dyestuff component having chemically linked to its molecule a radical having substantially the chemical structure of a bile acid.

3. A light-sensitive silver halide gelatin emulsion suitable for color photography containing a dyestuff component, which in connection with the oxidation product of an aromatic amino developer forms a colored body and which is fast to diffusion with respect to the gelatin, said dyestuff component having chemically linked to its molecule a radical having substantially the chemical structure of a sterol.

4. A light-sensitive silver halide gelatin emulsion suitable for color photography containing a dyestuff component, which in connection with the oxidation product of an aromatic amino developer forms a colored body and which is fast to diffusion with respect to the gelatin, said dyestuff component having chemically linked to its molecule a radical having substantially the chemical structure of a bile acid.

5. The photographic emulsion defined in claim 2 wherein the radicle having substantially the chemical structure of a bile acid is a radicle selected from the class consisting of those of cholanic acid, its mono-, di-, and tri- hydroxy substitution products and its oxidation products in which the side chain in 17-position has been removed and the 5-membered ring containing said chain has been opened up with the formation of a dicarboxylic acid.

6. The light-sensitive silver-halide gelatine emulsion defined in claim 4 wherein the radicle having substantially the chemical structure of a bile acid is a radicle selected from the class consisting of those of cholanic acid, its mono-, di-, and tri- hydroxy substitution products and its oxidation products in which the side chain in 17-position has been removed and the 5-membered ring containing said chain has been opened up with the formation of a dicarboxylic acid.

7. The light-sensitive silver halide gelatine emulsion defined in claim 4 wherein the radicle having substantially the chemical structure of a bile acid is the radicle of cholanic acid.

8. The light-sensitive silver-halide gelatine emulsion defined in claim 4, wherein the radicle having substantially the chemical structure of a bile acid is the radicle of cholic acid.

9. The light-sensitive silver-halide gelatine emulsion defined in claim 4, wherein the radicle having substantially the chemical structure of a bile acid is the radicle of desoxycholic acid.

10. The light-sensitive silver halide gelatine emulsion defined in claim 4, wherein the dyestuff component is the reaction product of cholanic acid chloride on 1-amino-5-hydroxynaphthalene-6-carboxylic acid.

GUSTAV WILMANNS.
WILHELM SCHNEIDER.
ALFRED FRÖHLICH.